Oct. 31, 1950     W. L. CARLSON ET AL     2,528,113
SINGLE UNIT CAPACITOR AND RESISTOR
Filed Oct. 18, 1946
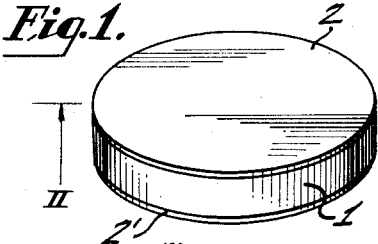
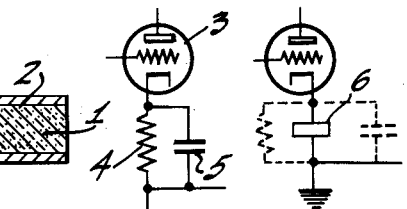
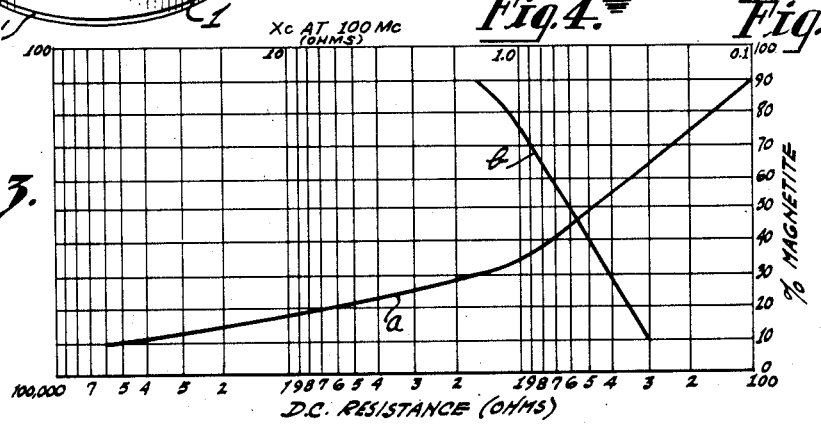
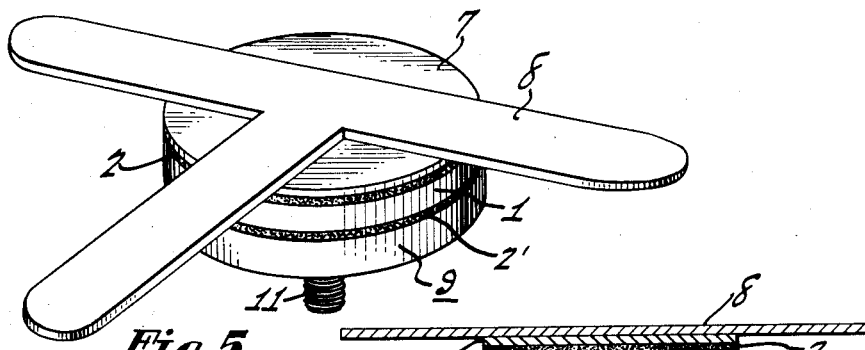
Inventors
Wendell L. Carlson
& Robert L. Harvey
Attorney Patented Oct. 31, 1950

2,528,113

UNITED STATES PATENT OFFICE 2,528,113

SINGLE UNIT CAPACITOR AND RESISTOR

Wendell L. Carlson and Robert L. Harvey, Princeton, N. J., assignors to Radio Corporation of America, a corporation of Delaware Application October 18, 1946, Serial No. 704,016

2 Claims. (Cl. 106—39)

This invention relates to a novel element which may be used in any circuit carrying radio frequency currents and has special utility in high frequency electronic devices. Basically, the invention comprises a single ceramic unit having both capacitance and resistance of such magnitude that it can be used as an element in a cathode circuit of a vacuum tube.

Heretofore, where electronic circuits, especially at higher frequencies, have required both a resistance and capacitance in parallel it has been necessary to have each one present in a separately constructed element. But with the present invention, it is now possible to incorporate both factors in a single element with consequent saving of space, lowering of construction cost, and improved performance.

One object of the invention is to provide a novel type of circuit element having both usable capacitance and resistance with low reactance at high frequencies.

Another object is to provide a novel ceramic circuit element having incorporated therein a sufficient amount of a resistive material to introduce a usable resistance value at the same time retaining a usable capacitance value.

Another object is to provide a radio frequency circuit element composed of a ceramic composition having a relatively high dielectric constant and also having a substantial amount of magnetite incorporated therein.

Fig. 1 is a perspective view of a typical metal coated ceramic disc constructed according to the present invention.

Fig. 2 is a cross section view taken along a diameter II—II of Fig. 1.

Fig. 3 is a graph showing reactance at 100 megacycles plotted against percent magnetite in a disc having a diameter of ⅝ inch and a thickness of about 1/16 inch and also a curve of D. C. resistance for various percentages of magnetite in the same size disc.

Fig. 4 is a circuit diagram showing a typical application of a circuit having separate resistor and capacitor in parallel for which the single unit of the invention may be substituted.

Fig. 4a is the circuit of Fig. 4 with the unit of the invention substituted for the resistor and capacitor.

Fig. 5 is a perspective view of the disc of Fig. 1 in a preferred form of terminal assembly.

Fig. 6 is a partial cross section view of the assembly of Fig. 5.

In application, Serial No. 659,232, filed April 3, 1946, of Robert L. Harvey, et al., there is described a ceramic capacitor having specially designed terminals with practically no inductance. The heart of this capacitor is a disc composed of barium and strontium titanates with "fired-on" coatings of silver on each face to serve as electrodes. The ceramic material of which the disc is composed has a very high dielectric constant, it being of the order of 5000.

The present invention utilizes terminals of design similar to those described in the above mentioned application. There is also utilized a ceramic disc and the ceramic material out of which it is made is also similar to that mentioned in the previous application but has an added ingredient in the form of a finely divided resistance material such as magnetite, $Fe_3O_4$.

A disc such as used in the present invention is shown in Figs. 1 and 2. One example of making up one of these discs is as follows:

A ceramic powder composed of 71 percent barium titanate and 29 percent strontium titanate is mixed with a quantity of finely powdered magnetite by ball milling or tumbling. The proportions of ceramic to oxide may be 40 to 60. The powder is pressed to form a disc, fired at 2400° F. and cooled. Both faces of the disc then have a closely adherent conductive metal coat applied to them. This is preferably done, as described in application, Serial No. 659,232, by applying a coating of silver paste and firing at about 700° C. This produces metal electrodes which are hard and integral with the ceramic disc.

In Figs. 1 and 2, the ceramic disc containing the magnetite is designated as 1, while 2—2' are the metal coatings which serve as electrodes.

An element of this type having a diameter of about 5/16 inch, thickness of about 1/16 inch, and the composition described in the example has a resistance of about 300 ohms D. C. and a reactance of only 0.8 ohm at a frequency of 100 megacycles. Compared with a ceramic disc capacitor of the same size and composition but having no magnetite present, this element has about 62.5 percent as much capacitance. This is not in accordance with what would ordinarily be expected since replacing 60 percent of the ceramic with the resistive material might be expected to lower the capacitance in about the same ratio.

The amount of magnetite which may be added to the high dielectric constant ceramic may be greatly varied. Fig. 3 shows the change in the characteristics of one of these elements when the amount of magnetite is varied between 10 and 90 percent of the total mix. Curve *a* shows how the D.-C. resistance of the element drops from 60,000 to 100 ohms as the percentage of magnetite is increased. Curve $b$ indicates that reactance at 100 megacycles rises from 0.3 to 1.6 ohms as the percentage of magnetite in the mix is increased from 10 to 90 percent of the whole but even at 90 percent magnetite, the reactance is still sufficiently low.

Ceramics composed of 71 percent barium titanate and 29 percent strontium titanate have a dielectric constant, $k$ of about 5000. The composition containing these two material may be varied to some extent, as is well known, and still retain a reasonably high $k$ value. For the purposes of the invention, a dielectric constant of 2000 or above is preferred; compositions of the two titanates may be made up having almost any desired $k$ value within this range by raising the percentage of either of the two components in relation to the other as compared to the example of the optimum composition given immediately above. Compositions of other ceramic materials are also known which have a sufficiently high dielectric constant to be used in the invention. Most of them have a higher power factor but this is not a disadvantage where a considerable amount of the magnetic iron oxide is to be added in any event.

Very stable resistive materials other than magnetite have properties which enable them to be used in a manner similar to that described above but magnetite is unique among all the materials which have been tested. For example, carbon burns off at the high firing temperature required and copper changes to some other form, probably an oxide which has too high a resistance to be of practical value. Carborundum appears to react strongly with the ceramic producing a porous product. Iron, apparently, does not change to one of the oxides but is ineffective at all observed percentages.

The element of the present invention has many practical applications in electronic circuits and especially at the higher frequencies. Figs. 4 and 4$a$ show how it may be used to take the place of a separate resistor and capacitor connected in parallel in a cathode circuit of a vacuum tube. The circuit illustrated is a typical example in which a vacuum tube 3 has in its cathode circuit a biasing resistor 4 and a by-pass condenser 5. Heretofore, these have always been separate elements. However, it is now possible, as shown in Fig. 4$a$, to substitute for both these elements a single element 6 comprising a disc or other shaped element made according to the invention with its composition adjusted such that it has the desired resistance and capacitance value. It will be at once apparent that this may effect not only a saving in cost of material and labor but saves space as well since the single element is very compact. In the same way, the new element may be used at any other point in an electronic circuit requiring a combination of a resistance and capacitance in parallel.

Application, Serial No. 659,232, previously referred to, taught how a ceramic disc used as a by-pass capacitor could be incorporated in an improved assembly which eliminated most of the usual inductance due to leads and connections usually associated with ceramic capacitors. The same advantages are obtained in incorporating the discs of the present invention in this type of assembly. Fig. 5 is a perspective drawing of a preferred form of a complete unit. A thin metal disc 7 is secured to a multiarmed terminal 8 and the terminal disc is then soldered to one of the silver surfaces 2 of the ceramic disc 1. The opposing silvered surface 2' of the ceramic disc is soldered to the stud 9 which may have a knurled portion 10 and a threaded portion 11 to aid in attachment to a metal chassis. The assembled unit may be impregnated with a wax or coated with varnish and may also be encased in a plastic such as a methyl methacrylate synthetic resin.

The assembly above described is a preferred form having unusually low inductance but any other desired means of connecting the element of the invention into an electronic circuit may be used.

For high frequency work, at say 100 megacycles or above, the low impedance of the units made according to the invention constitutes a distinct advantage over hitherto known devices since there is always considerable unavoidable inductance present in the leads when separate capacitors and resistors are used.

We claim as our invention:

1. A dielectric material for use in a unit having both usable capacitance and D.-C. resistance with low reactance at high frequencies, said material comprising a ceramic body consisting essentially of a mixture of barium and strontium titanates, said barium and strontium titanates being present in such a ratio as to provide a mixture having a dielectric constant of at least 2000, and said body having distributed homogeneously throughout an amount of finely divided magnetite constituting from 10 to 90 percent by weight of the body.

2. A material according to claim 1 in which the titanates are present in a ratio of 71 percent barium titanate to 29 percent strontium titanate and in which the percentage of magnetite in said body is 60.

WENDELL L. CARLSON.
ROBERT L. HARVEY.

REFERENCES CITED

The following references are of record in the file of this patent:

UNITED STATES PATENTS

| Number | Name | Date |
|---|---|---|
| 829,174 | Schattner | Aug. 21, 1906 |
| 850,270 | Steinmetz | Apr. 16, 1907 |
| 897,800 | Steinmetz | Sept. 1, 1908 |
| 1,045,985 | Kraus | Dec. 3, 1912 |
| 1,506,781 | Shrader | Sept. 2, 1924 |
| 2,370,443 | Biefeld | Feb. 27, 1945 |
| 2,371,660 | Wainer | Mar. 20, 1945 |
| 2,398,088 | Ehlers | Apr. 9, 1946 |
| 2,403,657 | Harvey | July 9, 1946 |
| 2,420,692 | Wainer | May 20, 1947 |

FOREIGN PATENTS

| Number | Country | Date |
|---|---|---|
| 110,462 | Australia | Apr. 26, 1940 |
| 367,147 | Great Britain | Feb. 18, 1932 |
| 463,096 | Great Britain | Mar. 22, 1937 |

OTHER REFERENCES

"Erie Button Silver-Mica Condensers" catalog sheet of the Erie Resistor Corp., printed July 1, 1943.